June 28, 1966    J. R. TURK    3,258,624
SNAP RING ASSEMBLY FOR SECURING A ROTOR TO A SHAFT
Filed July 25, 1963
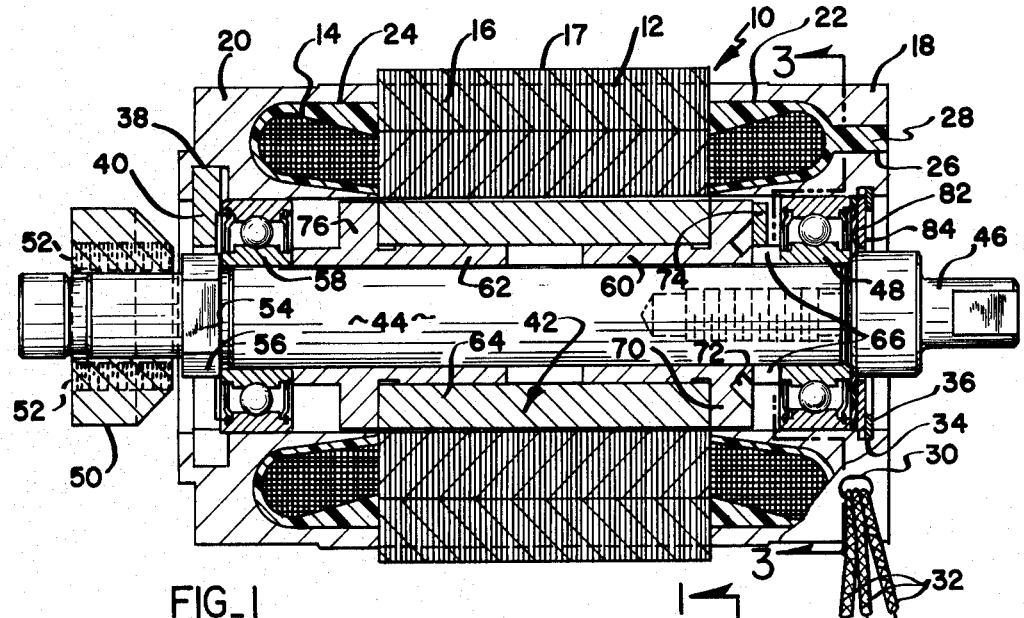
FIG_1
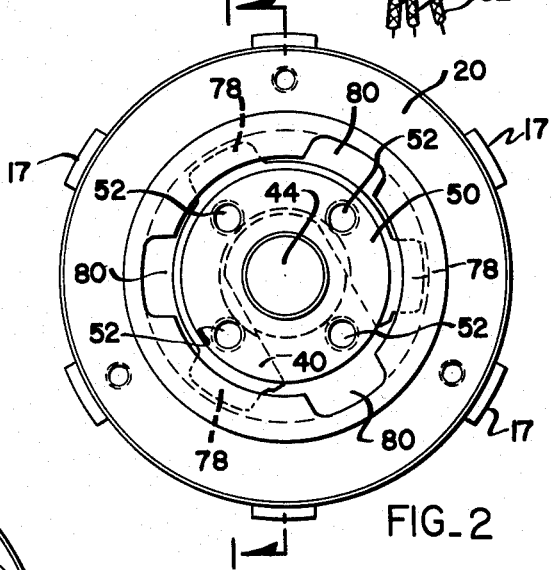
FIG_2
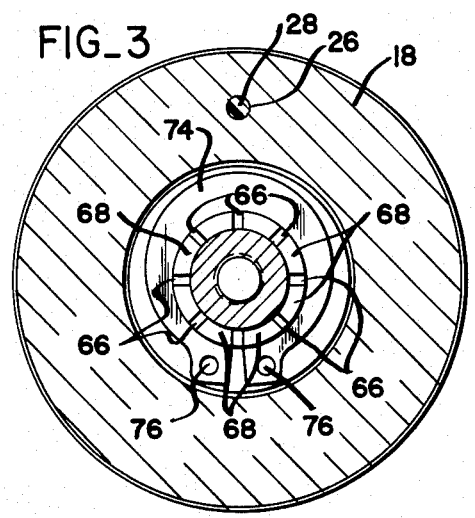
FIG_3
INVENTOR.
JAMES R. TURK
BY
Oberlin, Maky & Donnelly
ATTORNEYS

United States Patent Office 3,258,624
Patented June 28, 1966

3,258,624
SNAP RING ASSEMBLY FOR SECURING A ROTOR TO A SHAFT
James R. Turk, Solon, Ohio, assignor to Vincent K. Smith, Gates Mills, Ohio
Filed July 25, 1963, Ser. No. 297,531
7 Claims. (Cl. 310—261)

The present invention relates generally as indicated to a dynamoelectric machine and more particularly to a novel rotor assembly therefor.

Although the rotor assembly forming the present invention has utility in connection with various type electric motors, it is particularly suited for use in hysteresis motors where a high degree of accuracy is required to maintain the concentricity of the rotor shaft with respect to the stator bore within very close tolerances. In this regard, the present invention comprises an improvement over that disclosed in my copending U.S. application Serial No. 5,485, filed January 29, 1960, now abandoned, entitled, "Dynamoelectric Machine and Method of Making the Same," and attention is directed thereto for a more complete discussion of the operating principles of hysteresis and other type electric motors.

A primary object of the present invention is to provide a rotor assembly which can be quickly and easily assembled on or disassembled from the stator assembly.

A further object of the present invention is to provide a rotor assembly which can be precisely balanced while disassembled and which can be assembled in the stator bore so as to maintain its precisely balanced condition.

A further object of the present invention is to provide a rotor assembly having a novel means for mounting the rotor sleeve on the rotor shaft.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a diametrical cross-section view along line 1—1, FIG. 2, showing a hysteresis motor constructed in accordance with the present invention;

FIG. 2 is an end elevational view as viewed from the left-hand end of FIG. 1; and FIG. 3 is a cross-section view taken on line 3—3, FIG. 1.

Referring now in more detail to the drawings, the stator assembly of the present invention is generally indicated at 10 and comprises a stack of annular laminations 12 which collectively define a spider-like structure, the slots (not shown) of which are adapted to receive the stator coils 14 in a conventional manner. The slots in the spider are lined in the usual manner with insulating material (not shown), and in the form shown, the end loops of the stator windings 14 extend outwardly beyond the ends of the laminations 12. The spider laminations 12 are tightly encased by a laminated yoke 16 which has a series of radially extending projections 17 which extend outwardly from the periphery thereof. Stator housing end rings 18 and 20 are connected to the ends of the spider laminations 12 and the yoke laminations 16 by any suitable means, for example welding. Each of the end rings 18 and 20 is provided with inwardly directed annular openings or chambers 22 and 24, respectively, which receive the end loop portions of the stator windings 14. The bores of the end rings 18 and 20 closely approximate the inner diameter of the spider laminations 12 whereby the end rings 18 and 20 form therewith a continuous smooth bore for the reception of the rotor assembly to be hereinafter described. The end ring 18 is provided with one or more openings 26 which communicate with the annular chamber 22 whereby a suitable insulating material, indicated at 28, for example an epoxy casting resin, can be poured into the stator assembly through such openings, such casting resin completely filling the voids in the spider laminations 12 and in the annular chambers 22 and 24. The manner in which the epoxy casting resin is introduced into the stator assembly 10 is clearly described in the above-referred to application.

The end ring 18 is provided with a lateral opening 30 through which leads 32 of the windings 14 extend for connection to an electrical power source (not shown). The end ring 18 is additionally provided with an undercut recess or groove 34 for receiving a snap ring 36, the purpose of which will become more apparent hereinbelow. Similarly, the end ring 20 is provided with an annular groove or undercut 38 for receiving a bearing retaining member 40.

The rotor assembly of the present invention is generally indicated at 42 and comprises a rotor shaft 44 the opposite ends of which extend outwardly beyond the ends of the end rings 18 and 20 as shown. The forward or rightmost end as viewed in FIG. 1 is internally threaded for receiving a shaft screw 46 which functions to facilitate handling of the rotor assembly as well as to prevent outward movement of the adjacently disposed anti-friction bearing 48. The opposite end of the rotor shaft 44 has mounted thereon by any suitable means, for example, adhesive bonding, a hub 50 to which the device to be driven can be mounted, the hub 50 being provided with a plurality of threaded openings 52 for such purpose. To facilitate wrench handling of the rotor assembly, the hub end of the rotor shaft 44 is provided with flats 54, the flats forming part of an enlarged diameter rotor portion 56 which serves to prevent outward movement of the antifriction bearing 58.

Adapted to be frictionally coupled to the shaft 44 for rotation therewith is a separable cobalt or like sleeve unit comprising nonmagnetic brass plugs 60 and 62, and a high hysteretic, continuous cobalt sleeve 64 adapted to be mounted around the brass rings 60 and 62 in the manner shown. As indicated in FIG. 1, the cobalt sleeve 64 has a length approximately equal to the length of the stator laminations 12. The radial outer surfaces of the cobalt sleeve 64 and the brass plugs 60 and 62 are closely spaced from the bore of the stator assembly 10 and are adapted to be maintained in concentric relation therewith by means of the bearings 58 and 48.

The brass plugs 60 and 62 are adapted to be adhesively bonded to the cobalt sleeve 64 with the thus bonded sleeve unit being frictionally coupled for rotation with the rotor shaft 44. In bonding the cobalt sleeve 64 to the brass plugs 60 and 62, any suitable commercially available bonding cement can be used, with such cement being applied to the mating surfaces of the cobalt sleeve and the brass plugs 60 and 62. The settings of the adhesive bonding will rigidly connect the cobalt sleeve with the brass plugs to form a separate unit which can quickly be moved to or from telescoping engagement with the rotor shaft 44.

The outermost end of the brass plug 60 is formed with a series of radial slots 66, FIG. 3, there being eight in the form shown, to facilitate a frictional coupling of the brass plug 60 to the rotor shaft 44 for rotation therewith. Such outer end of the plug 60 is thus in the form of a plurality of individual finger-like sections 68 and to further facilitate bending or flexing of these fingers 68, the radially enlarged portion 70 of the brass plug 60 is formed with an annular, beveled recess 72. A metallic resilient retaining ring 74, best shown in FIG. 3, is adapted to be telescoped around the fingers 68 whereby subsequent release thereof will flex or bend the fingers 68 into tight frictional engagement with the rotor shaft 44 thereby coupling the brass plug 60 and the bonded sleeve unit thereto. To facilitate placement of the retaining ring 74 over the fingers 68, the retaining ring 74 is provided with a pair of openings 76 through which a suitable tool can be disposed for slightly enlarging the retaining ring opening for easy placement over the fingers 68 of the brass plug 60. In the usual manner, release of such tool from the openings 76 will cause the retaining ring to resiliently clamp the fingers 68 to the rotor shaft 44 as above described.

As above stated, it is of primary importance that the rotor assembly 42 be precisely dynamically balanced before placement thereof within the stator bore in order to achieve optimum operating results. To precisely dynamically balance the rotor assembly, the sleeve unit comprising the brass plugs 60 and 62 and the cobalt sleeve 64 are placed over a master shaft (not shown) specially provided for such purpose and the resilient retaining ring 74 is placed around the fingers 68 to thereby couple the brass plug 60 to the master shaft. When the retaining ring 74 is so positioned, a suitable tool is employed to scribe the outline of the retaining ring on the adjacently disposed face of the brass plug 60 so that the retaining ring can be located in exactly the same position thereon when these components are subsequently placed over the rotor shaft 44. The sleeve unit is then balanced on the master shaft to .000025 oz. in., and to correct any unbalance holes can be drilled radially inward from the enlarged diameter portion 70 of the brass plug 60 and the corresponding enlarged diameter portion 76 of the brass plug 62. After the sleeve unit has thus been dynamically balanced on the master shaft, the retaining ring 74 is then removed thereby uncoupling the assembly from the master shaft whereupon this assembly is adapted to be placed over the rotor shaft 44 during the final assembling process.

The bearing retaining member 40 above briefly mentioned comprises a split spring member having radial tongues collectively referenced at 78 which are adapted to spring apart to retain the member 40 in the undercut 38 and prevent the accidental dropping out thereof. To accommodate the receiving of the bearing retainer 40 in the undercut 38, the end ring 20 is provided with three circumferentially spaced openings collectively shown at 80 in the end wall thereof, such openings being spaced to corerspond with the spacing of the tongues 78 of the bearing retaining member 40. The openings 80 communicate with the undercut 38 and it will accordingly be seen that when the bearing retaining member 40 is disposed adjacent the end of the end ring 20 with the tongue members 78 aligned with the openings 80, the bearing retaining member 40 can be then positioned in the undercut 38 whereby subsequent rotation thereof will firmly seat the retaining member 40 in such undercut, the latter such position being shown in dotted lines in FIG. 2.

To assemble the electric motor components above described, and with screw 46 removed from shaft 44, the bearing 58 is first positioned against enlargement 56. Then the rotor assembly 42, 60, 62, and 74 is forced on shaft 44, the plugs 60 and 62 having bores slightly smaller than the rotor diameter so as to be a press-fit thereover. Next, the bearing 48, spring 82, back-up washer 84 and snap ring 36 may be assembled in that order in the right-hand end of stator assembly 10, whereupon the above-described rotor assembly may be inserted into the stator 10 from the left-hand end and retained by retainer 40 inserted and rotated in undercut 38. The retainer 40 preferably springs open so the tongues 78 will frictionally engage the wall of undercut 38. The final assembly operation then will be to securely screw the shaft screw 46 into the right-hand end of the rotor shaft 44 to clamp the bearings 58 and 48 against the plugs 62 and 60.

Disassembly of the electric motor would of course be accomplished in the reverse order of that described and, of course, the entire rotor assembly 42 may be removed from the left end of the stator assembly 10 upon removal of retainer 40.

It will accordingly be seen that the present invention provides a highly compact and simplified electric motor construction which is nonetheless highly accurately constructed. The bonded cobalt sleeve unit of rotor assembly is precisionally dynamically balanced and is accurately maintained in concentric relation with the stator bore to provide a relatively small, uniform air gap between the stator bore and the hysteresis cobalt sleeve member 64. Further, the separable rotor assembly can be quickly inserted or removed from the stator bore and the hysteresis element and the brass plugs bonded thereto can be quickly and easily frictionally coupled or uncoupled to the rotor shaft.

Other modes of applying the principle of the invention may be employed, change being made as regards the details described, provided the features stated in any of the following claims, or the equivalent of such, be employed.

I, therefore, particularly point out and distinctly claim as my invention:

1. A dynamoelectric machine comprising a stator assembly providing a smooth, uniform diameter stator bore, a rotor assembly mounted for rotation within said stator bore, said rotor assembly comprising a rotor shaft and a sleeve unit telescopically mounted on said shaft, one end of said sleeve unit being formed with a plurality of axially extending fingers, and a resilient retaining ring disposed around said fingers for clamping said fingers to said shaft thereby coupling said unit to said shaft for rotation therewith.

2. The combination of claim 1 wherein said sleeve unit comprises a pair of non-magnetic plug members closely fitted on said shaft, and a high hysteretic sleeve member adhesively bonded to said plug members, said axially extending fingers being formed in one of said plug members.

3. The combination of claim 2 wherein said one plug member is provided with an annular groove adjacent said fingers for enhancing the flexing of said fingers about said shaft by said retaining ring.

4. The combination of claim 2 wherein said non-magnetic plug members are brass and said high hysteretic sleeve member is cobalt.

5. The combination of claim 2 wherein said sleeve unit prior to assembly is dynamically balanced with said resilient retaining ring disposed around said fingers, and there is a scribed outline of said retaining ring on said one plug member made subsequent to such dynamic balancing for accurately relocating said retaining ring on said one plug member during assembly.

6. The combination of claim 1 further including end rings at each end of said stator assembly, said end rings having axially aligned bores into which the ends of said rotor shaft extend, antifriction bearings disposed in said end ring bores around said rotor shaft at each end of said sleeve unit, said antifriction bearings serving to maintain said rotor assembly accurately concentrically aligned relative to said stator bore, the bore wall of one of said end rings being provided with an undercut in which there is disposed a bearing retaining member for retaining the adjacently disposed bearing within said one end ring bore, and a plurality of circumferentially spaced openings in said bore wall of said one end ring extending into said undercut, said bearing retaining member comprising a split spring member having a plurality of radial tongues the number and spacing of which correspond to said openings in said one end ring, whereby said retaining member may be rotated to bring said tongues into and out of alignment with said openings for disassembly and assembly of said retaining member in said undercut.

7. The combination of claim 6 further including a preload spring resiliently contacting the other of said antifriction bearings for longitudinally biasing both of said bearings and said sleeve unit toward said bearing retainer member to prevent longitudinal movement thereof.

References Cited by the Examiner

UNITED STATES PATENTS

| | | | |
|---|---|---|---|
| 2,668,925 | 2/1954 | Bloser | 310—43 |
| 2,922,902 | 1/1960 | Hargreaves | 310—43 |
| 2,927,229 | 3/1960 | Merrill | 310—162 |
| 3,042,820 | 7/1962 | Diamond | 310—43 |
| 3,164,735 | 1/1965 | Lichowsky | 310—162 |

FOREIGN PATENTS

| | | |
|---|---|---|
| 511,446 | 3/1955 | Canada. |
| 1,073,625 | 9/1955 | France. |
| 917,729 | 4/1963 | Great Britain. |

MILTON O. HIRSHFIELD, *Primary Examiner.*

ORIS L. RADER, J. W. GIBBS, *Assistant Examiner.*